No. 793,849. Patented July 4, 1905.

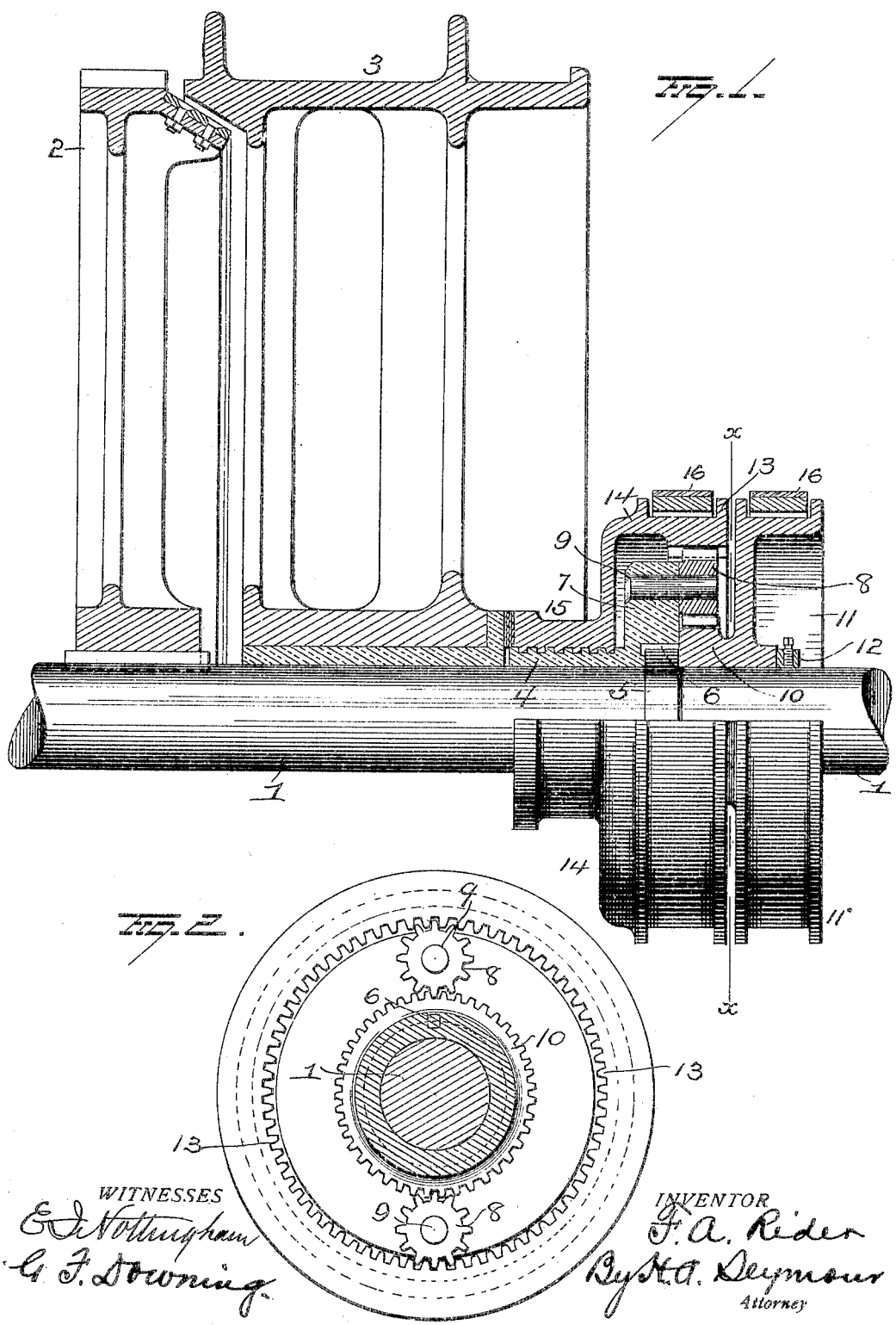

UNITED STATES PATENT OFFICE.

FRANK A. RIDER, OF SCOTTDALE, PENNSYLVANIA, ASSIGNOR TO SCOTTDALE FOUNDRY & MACHINE CO., OF SCOTTDALE, PENNSYLVANIA.

CLUTCH-OPERATING MECHANISM.

SPECIFICATION forming part of Letters Patent No. 793,849, dated July 4, 1905.

Application filed July 16, 1904. Serial No. 216,876.

*To all whom it may concern:*

Be it known that I, FRANK A. RIDER, a resident of Scottdale, in the county of Westmoreland and State of Pennsylvania, have invented certain new and useful Improvements in Clutch-Operating Mechanism; and I do hereby declare the following to be a full, clear, and exact description of the invention, such as will enable others skilled in the art to which it appertains to make and use the same.

My invention relates to an improved clutch-operating mechanism, the object of the invention being to provide improvements of this character of simple construction, comprising but few parts, and the operation of which is easily and positively accomplished; and the invention consists in certain novel features of construction and combinations and arrangements of parts, as will be more fully hereinafter described, and pointed out in the claims.

In the accompanying drawings, Figure 1 is a fragmentary view, partly in vertical longitudinal section and partly in elevation; and Fig. 2 is a view in section on the line *x x* thereof.

1 represents a continuously-rotating shaft, having a clutch member 2, of any approved construction, fixed thereon, and 3 is a drum or pulley loose on the shaft. While of course the shaft need not be a continuously-rotating shaft, it may be, and my improvements will operate with equal effectiveness upon a continuously-rotating or intermittently-rotating shaft and are not limited to either.

4 represents a sleeve externally screw-threaded throughout the greater portion of its length and recessed at its end to receive an annular shoulder or enlargement 5 on shaft 1 and locked to turn with said shaft by a key 6, located in grooves in the shoulder 5 and sleeve 4. This sleeve 4 at its enlarged end is provided with two (more or less) radial arms or a disk-like head 7, carrying pinions 8, mounted to turn on journals 9, secured in said arms 7 and meshing with an external gear 10 on the hub of a wheel 11, mounted to turn loosely on shaft 1 and held in proper position between a ring or collar 12 and the annular shoulder or enlargement 5. The pinions 8 also mesh with an internal gear 13 in a wheel 14, the hub 15 of which latter is elongated and internally screw-threaded to intermesh with the external screw-threads of sleeve 4. The wheels 11 and 14 are both grooved to receive brake-bands 16 to control their turning movement, and the operation of my improvements is as follows: With the parts as shown in Fig. 1 when it is desired to clutch pulley or drum 3 to shaft 1 the brake-band 16 is tightened on wheel 14 to retard or stop the same, and as the shaft 1 and sleeve 4 thereon will then be turned faster than wheel 14 and hub 15 thereof the intermeshing screw-threads will cause the wheel 14 and hub 15 to be moved to the left and force the drum or pulley 3 into tight engagement with clutch member 2, and when pressure of the brake-band 16 on wheel 14 is released the parts will turn together and the drum retained in locked engagement with clutch member 2 as long as may be desired. To release the pulley or drum from its clutched position, the brake-band 16 is tightened on wheel 11, causing the latter to run slowly or stop and through the medium of the pinions 8 increasing the speed of wheel 14 and hub 15 in excess of the speed of shaft 1 and sleeve 4 and causing the wheel 14 to move to the right and release the drum or pulley from the clutch member.

As seen in the drawings, the internal gear-teeth 13 are elongated to permit of movement of wheel 14 and always maintain full engagement of the teeth of the internal gear with the pinions 8, and other forms of gearing might be employed for changing the relative speeds of wheels 11 and 14, and various forms of clutch mechanism might be employed without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a clutch-operating mechanism, the combination with a shaft, of an externallyscrew-threaded sleeve secured on said shaft, a wheel having screw-threads to mesh with the screw-threads on the sleeve, a wheel loose on the shaft, gearing connecting said wheels, and means for retarding the speed of either of said wheels to compel the first-mentioned wheel to move longitudinally of the shaft.

2. In a clutch-operating mechanism, the combination with a shaft, of an externally-screw-threaded sleeve secured on said shaft, a wheel having screw-threads to mesh with the screw-threads on the sleeve an internal gear in said wheel, a wheel loose on the shaft, a gear carried by the loose wheel a pinion carried by the sleeve meshing with the gear in the first-mentioned wheel and the gear on the loose wheel, and means for retarding the speed of either of said wheels to move the first-mentioned wheel longitudinally of the shaft.

3. In a clutch-operating mechanism, the combination with a shaft, of an externally-screw-threaded sleeve secured on the shaft, a wheel having internal screw-threads in its hub meshing with the screw-threads on the sleeve an internal gear in said wheel, a wheel loose on said shaft, a gear carried by the loose wheel radial arms on the sleeve, pinions on said arms meshing with an internal gear in the first-mentioned wheel and the gear on the hub of the other wheel, and brake-bands around said wheels to retard the speed of either.

4. The combination with a shaft, a clutch member fixed on said shaft, a drum or pulley loose on the shaft and adapted to coöperate with the clutch member to lock the drum or pulley and shaft together, of an externally-screw-threaded sleeve fixed on the shaft, a wheel having screw-threads meshing with those on the sleeve and said wheel abutting against the drum or pulley, means for retarding the rotation of said wheel, a second wheel mounted loose on the shaft, gearing between said wheels, and means for retarding the rotation of the second wheel to increase the speed of the first-mentioned wheel, substantially as and for the purpose set forth.

In testimony whereof I have signed this specification in the presence of two subscribing witnesses.

FRANK A. RIDER.

Witnesses:
 E. L. RUTHERFORD,
 W. SAMPSON WILEY.